United States Patent [19]

Lu

[11] Patent Number: 6,110,864
[45] Date of Patent: Aug. 29, 2000

[54] SECURITY CARD AND METHOD FOR MAKING SAME

[75] Inventor: Shih-Lai Lu, Woodbury, Minn.

[73] Assignee: 3M Innovative Properties Company, St. Paul, Minn.

[21] Appl. No.: 08/969,045

[22] Filed: Nov. 12, 1997

Related U.S. Application Data

[63] Continuation of application No. 08/668,587, Jun. 18, 1996, Pat. No. 5,688,738, which is a continuation of application No. 08/294,755, Aug. 23, 1994, abandoned, which is a continuation-in-part of application No. 08/128,484, Sep. 28, 1993, abandoned.

[51] Int. Cl.$^7$ ............................. B41M 5/035; B41M 5/38
[52] U.S. Cl. ......................... 503/227; 283/94; 283/109; 283/110; 283/904; 428/1; 428/204; 428/209; 428/480; 428/500
[58] Field of Search ................................. 156/235, 237; 283/67, 70, 94, 107, 109, 110, 904; 428/195, 203, 204, 206, 207, 212, 213, 215, 480, 483, 500, 913, 914, 1, 209; 503/227

[56] References Cited

U.S. PATENT DOCUMENTS

| | | | |
|---|---|---|---|
| 4,507,349 | 3/1985 | Fromson et al. | 428/195 |
| 4,557,963 | 12/1985 | Caines | 428/156 |
| 4,869,946 | 9/1989 | Clay | 428/167 |
| 5,060,981 | 10/1991 | Fossum et al. | 283/109 |
| 5,254,390 | 10/1993 | Lu | 428/156 |
| 5,380,044 | 1/1995 | Aitkens et al. | 283/67 |

FOREIGN PATENT DOCUMENTS

| | | | |
|---|---|---|---|
| WO 90/08661 | 8/1990 | European Pat. Off. | B42D 15/10 |
| 0 411 152 | 2/1991 | European Pat. Off. | B32B 33/00 |
| 0 419 241 | 3/1991 | European Pat. Off. | B41M 5/00 |
| 0 457 579 | 11/1991 | European Pat. Off. | B41M 5/00 |
| WO 91/07286 | 5/1991 | WIPO | B42D 15/10 |

OTHER PUBLICATIONS

Database WPI, Week 9329, Derwent Publications Ltd., London, GB; AN 93–232058 & JP5155153, Jun. 22, 2993 (abstract).
Database WPI, Week 9219, Derwent Publications Ltd., London, GB; AN92–154331 & JP4083685, Mar. 17, 1992 (abstract).
Database WPI, Week 9251, Derwent Publications Ltd., London, GB; AN 92–418030 & JP4299195, Oct. 22, 1992 (abstract).
Database WPI, Week 8224, Derwent Publications Ltd., London, GB; AN 82–48859E & JP57072852, May 7, 1982 (abstract).
Database WPI, Week 9316, Derwent Publications Ltd., London, GB; AN 93–129033 & JP5064978, Mar. 19, 1993 (abstract).
Database WPI, Week 9309, Derwent Publications Ltd., London, GB; AN 93–070700 & JP5016542, Jan. 26, 1993 (abstract).
Eastman Chemical Products, Inc. Product Brochure, "Kodar PETG copolyester 6763", Publication No. PG–28, Nov., 1986.
Eastman Chemical Products, Inc. Product Brochure "Kodar A150 Copolyester—Versatility in Extrusion, Blister Forming, and End Use–" Publication No. MB–58E; Apr. 1985.
Eastman Chemical Products, Inc. Product Brochure "Eastman Polyester Plastics for Packaging—Physical Property Data Sheet" Publication No. DS–193F, Feb., 1991.
Eastman Chemical Products, Inc. Product Brochure "Specialty Packaging Plastics—Physical Property Data Sheet"; Publication No. DSS–165J; Oct., 1993.

*Primary Examiner*—Bruce H. Hess
*Attorney, Agent, or Firm*—Peter L. Olson

[57] ABSTRACT

A security card comprising a backing, a cover film, and a security image, the security image being located between the backing and the cover film, the backing and the cover film being laminated together without an intermediate adhesive layer, wherein the backing comprises an amorphous copolyester or polyvinyl chloride, and the cover film comprises the other of polyvinyl chloride or an amorphous copolyester. Also, a method for making such security cards.

28 Claims, 1 Drawing Sheet

SECURITY CARD AND METHOD FOR MAKING SAME

This a continuation of U.S. Ser. No. 08/668,587, filed Jun. 18, 1996, now U.S. Pat. No. 5,688,738 which is a continuation of U.S. Ser. No. 08/294,755, filed Aug. 23, 1994, now abandoned which is a continuation-in-part of U.S. Ser. No. 08/128,484, filed Sep. 28, 1993, now abandoned.

FIELD OF INVENTION

The present invention relates to a security card, e.g., an identity card or a driver's license, and a method for making such cards.

BACKGROUND

Identification cards and badges such as driver's licenses, employee identification cards, military badges, etc. are frequently made in secure manner to prevent tampering and/or counterfeiting.

European Patent Application No. 91304385.7 (Beck et al.) discloses a security laminate comprising a thermal dye transfer print, an opaque polyvinyl chloride (PVC) base sheet modified by the addition of a dye receptor layer, and a polyester cover sheet laminated over the image on the base sheet without the use of an intermediate adhesive layer. Two disadvantages of such laminates are that they require an additional dye receptor layer on the base sheet and tend to warp on cooling after lamination because the thermal expansion coefficients of the PVC base layer, which melts as the card is laminated, and the polyester cover are different.

U.S. Pat. No. 5,060,981 (Fossum et al.) discloses a transparent polyester overlay with a polymeric image-receiving layer over a hot-melt adhesive layer. Following imaging, the overlay is laminated to a substrate. A disadvantage of this approach also is that under some conditions of manufacture the card may tend to warp on cooling after lamination because of the differences in the thermal expansion coefficients of the base layer, which typically is paper, and the polyester cover layer.

Another known approach is to use a polyolefin core layer enclosed and sealed via heat lamination in an envelope of clear polyester film. This eliminates the differences in thermal expansion coefficient that lead to warpage, but requires multiple printing steps to provide information on both front and back sides.

Despite the variety of known security card constructions and known methods for producing such cards, there exists a need for improved security cards that are made by an easy, inexpensive process using inexpensive materials.

SUMMARY OF INVENTION

The present invention provides a novel security card and a novel, "over-the-counter" or "desk top" method for making such security cards.

In brief summary, the security card of the invention comprises a backing, a cover sheet, and a security image with the image being located between the backing and cover sheet. The backing and cover sheet are laminated in direct contact together without an intermediate adhesive layer and one of the backing and the cover sheet comprises an amorphous copolyester, e.g., a copolymer of ethylene glycol, cyclohexanedimethanol, and terephthalic acid, and the other of the backing and the cover sheet comprises polyvinyl chloride.

Briefly summarizing, the method of the invention comprises the steps of:

a) providing a first sheet having first and second sides, said first sheet comprising polyvinyl chloride on at least its first side;

b) forming an image on the first side of the first sheet, preferably via thermal dye transfer;

c) providing a second sheet having first and second sides, the second sheet comprising an amorphous copolyester on at least its first side;

d) applying heat and pressure to laminate the first side of the second sheet to the first side of the first sheet so as to encapsulate the image;

wherein at least one of the first sheet and the second sheet is transparent such that the image is visible therethrough.

The present invention provides a novel security card and method for making such cards that does not require the use of special dye receptive layers or intermediate adhesive to assemble. The method of the invention provides a convenient, inexpensive process that can be utilized with conventional desk top laminators to produce security cards of the invention.

A primary advantage of the amorphous copolyester-PVC combination provided herein is that both materials melt or are softened during the lamination process and both contract on cooling at about the same rate, thereby avoiding the warping problems frequently encountered in many existing card constructions. Also, the polyvinyl chloride (PVC) material, which may be transparent or comprise pigment such as titanium dioxide ($TiO_2$), serves as an effective dye receptor material for use with thermal dye transfer systems.

BRIEF DESCRIPTION OF DRAWING

The invention will be further explained with reference to the drawing, wherein.

These figures, which are idealized, are not to scale and are intended to be merely illustrative and non-limiting.

DETAILED DESCRIPTION OF ILLUSTRATIVE EMBODIMENTS

Figure 1:
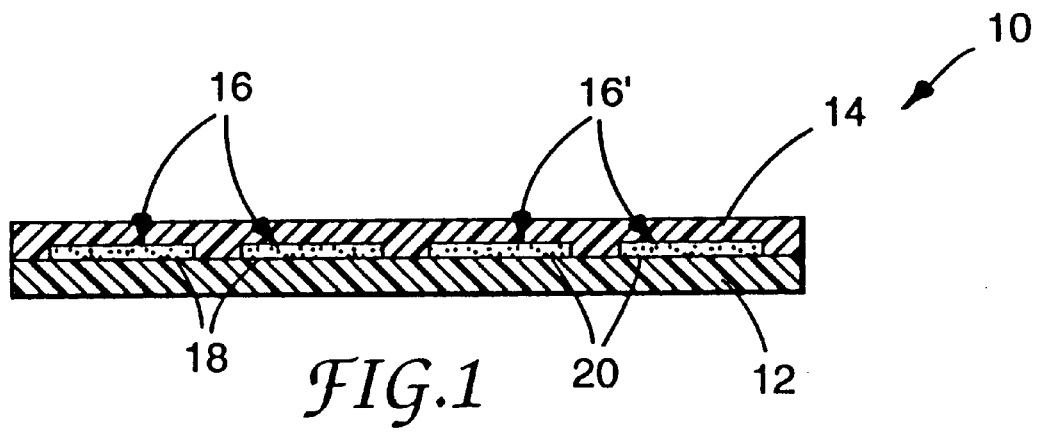
FIGS. 1–3 are each cross-sectional views of illustrative embodiments of security cards of the invention.

An illustrative security card of the invention is shown in FIG. 1 wherein card 10 comprises backing 12, transparent cover sheet 14, and security image 16.

Backing 12 and cover sheet 14 are fusibly laminated together, one of them comprising a preferably rigid polyvinyl chloride film and the other comprising an amorphous copolyester film. The other sheet comprises an amorphous copolyester that is to be bonded to the polyvinyl chloride layer of the first sheet. Illustrative examples of commercial copolyesters that can be used include VITEL™ PE-222, a solvent based copolyester from Goodyear that is believed to comprise 21 weight percent terephthalic acid, 23 weight percent isophthalic acid, 5 weight percent sebacic acid, 29 weight percent ethylene glycol, and 22 weight percent neopentyl glycol, and have a glass transition temperature ("$T_g$") of about 47° C., and KODAR™ PETG 6763, a copolyester from Eastman Chemical Products Company that is believed to comprise 16 weight percent cyclohexanedimethanol, 34 weight percent ethylene glycol, and 50 weight percent terephthalic acid, and have a $T_g$ of 81° C. and is readily available from vendors in film form. The copolyester should be "amorphous" copolyester. As used herein, an amorphous copolyester is one that substantially will not crystallize under the conditions used to laminate it to the polyvinyl chloride of the other sheet, i.e., the copolyester does not exhibit a melt crystallization temperature. Melt crystallization temperature ("$T_c$") is exhibited as a major discontinuity in the slope of specific volume versus temperature curve as the polymer cools. VITEL™ PE-222 copolyester and KODAR™ PETG 6763 copolyester, which have been found to be suitable for use in the present invention, have been found to not exhibit such a discontinuity and are considered herein to be amorphous. KODAR™ A150 Copolyester, a copolyester from Eastman Chemical Products Company that is believed to comprise cyclohexanedimethanol, terephthalic acid, and isophthalic acid, and have a $T_g$ of about 87° C., exhibits a $T_c$ of about 135° C., and is thus considered not to be an amorphous copolyester and has been found to be not suitable for use in the present invention.

An advantage of the present invention is that good adhesion can be achieved between polyvinyl chloride and amorphous copolyesters at relatively low lamination conditions, e.g., at temperatures between about 120° and about 150° C. for times of less than about 1 minute, sometimes less than about 30 seconds, in desk top type laminators. Suitable lamination temperatures, times, and pressures for specific materials can be readily determined by trial and error.

Security image 16 can be made up of a variety of graphic materials sealed between backing 12 and cover sheet 14. Card 10 may further comprise a secondary image (not shown) on the outer surface of cover sheet 14 if desired. Because security image 16 is located within the card, it is protected from wear as well as tampering attempts and is accordingly referred to herein as a "security image". Security image 16, typically bearing some information specific to the individual card (e.g., name, birth date, personal characteristics, employee number, etc.) is applied to the inner surface of cover sheet 14 or backing 12 at the time of assembly of card 10. For instance, images 18 consisting of dye diffused onto the surface of the polyvinyl chloride member prior to lamination to the amorphous copolyester member can be used. Thermal dye transfer ribbons from Imperial Chemical Industries, Inc. ("ICI") and DaiNippon Printing Company, Ltd. can be used. An advantage of the present invention is that images may be formed using thermal dye transfer processes without using a special receptor layer.

To improve the tamper resistance and facilitate verification or authentication of cards 10 of the invention, security image 16 may comprise, or if desired consist of, validation marks or areas 20 designed to provide a visually detectable indication of tampering, sometimes referred to as a validation feature. Illustrative examples include pearlescent particles in a transparent binder, holograms, microstructured surfaces providing special optical effects such as holographic images or diffractive effects, etc. Validation marks 20 may be applied by a number of techniques, depending upon the requirements of the chosen validation mark, e.g., printing process, or by any of several known processes to apply electronically recorded or computer generated graphics.

Backing 12 may be either transparent or opaque as desired, optionally containing dyes or pigments to provide a desired background color or degree of opacity to attain the desired visibility of security image 16 and to impart desired appearance to security card 10. Backings commonly contain a pigment such as titanium dioxide ($TiO_2$) to provide an opaque white background to improve legibility and conspicuity of security image 16. Backing 12 may have pre-printed symbols, logos, decorative designs, and information common to a group of related cards on either or both of its designated first (intended to be visible through cover sheet surface 14) or second surfaces (intended to be visible on the back side of card 10).

In many instances, backing 12 is considerably thicker and less flexible than cover sheet 14 as it is intended to provide a major proportion of the desired rigidity and strength of assembled card 10. For example, conventional credit cards are typically between about 675 and about 825 micrometers (27 and 33 mils) thick. When making security cards of the invention to meet the current conventional thickness, backings of between about 500 and about 550 micrometers (20 and 22 mils) and cover sheets of between about 175 and about 250 micrometers (7 and 10 mils) will be suitable and are commercially available. It will be understood that backings and cover sheets of other thicknesses may be used in accordance with the invention. Cover sheet 14 is optimized in many instances to protect security image 16 from tampering and wear while permitting it to be readily inspected and read. Cover sheet 14 is typically optimized to maintain its clarity, transparency, color, and appearance under the conditions to which card 10 is subjected, e.g., abrasion and wear.

In some instances when the backing is the amorphous copolyester, a thin layer of transparent polyvinyl chloride will be laminated to the back surface of the backing, i.e., opposite from the surface to which the cover sheet is laminated. Incorporation of pigments in amorphous copolyester (or in polyvinyl chloride when that is used as the backing) may tend to increase the material's susceptibility to soiling and wear. The unpigmented layer can act as a sheathing to enhance the card's resistance to soilage and wear. If a sheathing layer is used it is preferably of a material that will adhere directly to the backing, e.g., polyvinyl chloride to an amorphous copolyester backing, or amorphous copolyester to a polyvinyl chloride backing, or vinyl chloride/vinyl acetate copolymer to a polyvinyl chloride backing.

Figure 2:
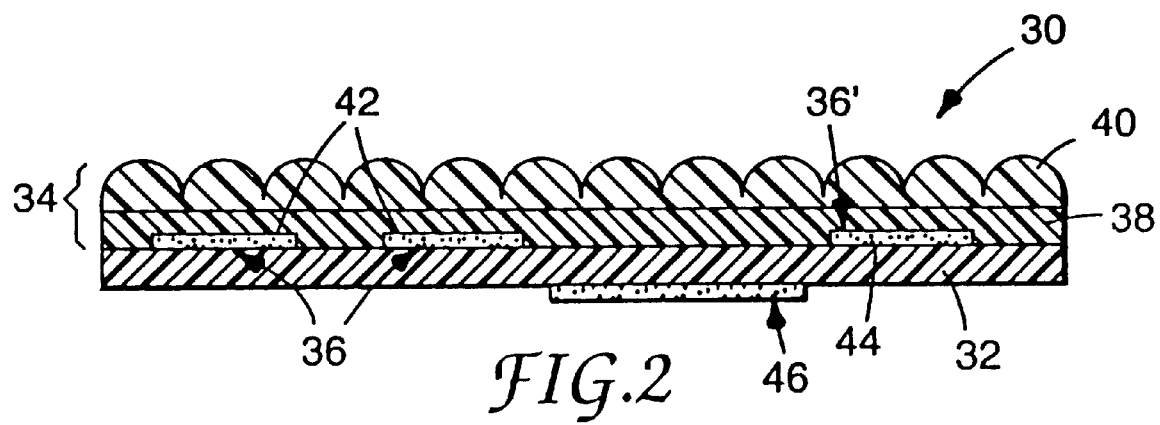

FIG. 2 shows another embodiment of the invention wherein security card 30 comprises backing 32, illustrative cover sheet 34, and security image 36. Cover sheet 34 is of the type disclosed in U.S. Pat. No. 5,254,390 (Lu), and is made up of a microstructured outer layer 40 with an array of hemispheroidal lens elements and inner layer 38. Outer layer 40 is made of a material in which the desired lens elements can be formed, e.g., curable urethane resin. Inner layer 38, in accordance with the invention is made up of either polyvinyl chloride or amorphous copolyester, to which outer layer 40 is adhered.

When cover sheets with such lens elements are employed, security image 36 may be specially selected to function with the lens elements. For instance, in addition to images of thermally transferred dye 42, security image 36 might include a material with specularly reflective properties 44, e.g., liquid crystal polymer, multi-layer high index dielectric coatings, microstructured total internal reflectance material, etc.

In other embodiments, an additional image, referred to herein as a "secondary image", may be formed on the outside of the cover sheet or backing. The secondary image may be for decorative purposes, may present useful information, and/or may provide means for verifying authenticity of the card. For instance, an image might be printed on the outer surface of the cover sheet, a hologram may be bonded there, etc. Secondary images may be exposed on the cover sheet or backing, or may be covered, e.g., by a security laminate such as CONFIRM Brand Retroreflective Security Laminates from Minnesota Mining and Manufacturing Company. FIG. 2 shows an illustrative embodiment with secondary image 46 on surface of backing 32. As can the security image, the secondary image may be human readable and/or machine readable.

Figure 3:
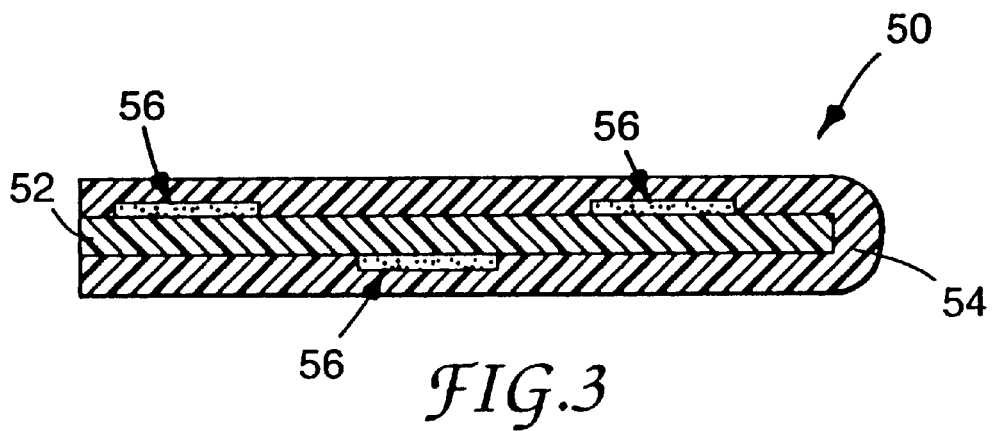

Another embodiment of the invention is shown in FIG. 3 wherein security card 50 comprises backing 52, cover sheet 54, and security image 56. Cover sheet 54 is wrapped around backing 52 so as to cover both sides thereof (typically the edges of the card will be die cut after lamination, not shown here). Alternatively, two separate pieces of cover sheet material, one applied to one side of backing 52 and one applied to the other, could be used. Such embodiments provide more available image area, thus providing more options to issuing authorities. For instance, human readable information and tamper-resistant images might be placed on one side of the card and machine readable features, such as bar codes, infrared or ultraviolet legends, etc., might be placed on the other side if desired.

One of the advantages of the invention is that security cards of the invention can be readily assembled, in either large or small quantities as desired, without the use of large, sophisticated equipment. An illustrative issuing process is described as follows. First, the potential cardholder's application is completed. Second, a computer workstation operator enters the data from the application form into the computerized system using a conventional computer keyboard. Third, the applicant provides a signature on a graphics tablet that provides a digitized representation of the signature to the computer. Fourth, the applicant's portrait is obtained in electronic form, with a conventional video camera. Fifth, the application form data, signature, and portrait are merged into a video display and checked for errors. Sixth, the digital signals representing the video display are transmitted to a printer. Seventh, three dye colors are sequentially heat transferred to the smooth polyvinyl chloride film (that will serve as a cover sheet), forming a color image diffused into the film, of the data, signature, and portrait previously shown on the video display. Eight, the imaged cover sheet is placed in contact with the amorphous copolyester backing, and the cover sheet and backing are laminated together with heat and pressure with a desktop laminator. Ninth, an identification card of the desired shape and dimensions is die-punched out of the resultant laminated assembly. Tenth, the finished card is checked for correct graphic content, imaging, lamination, and die-cutting quality. Finally, the finished card is issued to the intended cardholder.

In one useful embodiment, a security card of the invention will consist of a backing, a cover sheet, and a security image. As described above, the security image is located between the backing and the cover sheet, the backing and the cover sheet being laminated together without an intermediate adhesive layer. The backing comprises an amorphous copolyester or polyvinyl chloride on at least its first (i.e., inner) side, and the cover sheet comprises the other of polyvinyl chloride or an amorphous copolyester on at least its first (i.e., inner) side, with the first side of the backing being laminated to the first side of the cover sheet. The image comprises a dye diffused into the surface of the polyvinyl chloride member. The card may further comprise an optional secondary image on the outer surface of the cover sheet and/or the outer surface of the backing.

If desired, one or more magnetic stripes can be incorporated into security cards of the invention, typically embedded into or laminated onto the back surface of the backing. Commercially available magnetic strip materials sold for such uses typically have a solvent-borne or other polymeric coating (e.g., vinyl chloride/vinyl acetate copolymer) and have been observed to provide satisfactory adhesion to the polyvinyl chloride or amorphous copolyesters disclosed herein. Similarly, electronically interactive circuits can be incorporated in cards of the invention.

EXAMPLES

The invention will be further explained by the following illustrative examples which are intended to be non-limiting.

Example 1

This example illustrates the use of an amorphous copolyester backing and a polyvinyl chloride cover sheet in a security card in accordance with the invention.

A microstructured film like that in Example 4 of U.S. Pat. No. 5,254,390 was used as a cover sheet. The cover sheet comprised an outer layer of UV-cured resin with an outer surface array of hemispheroidal microlenses, about 37 micrometers (1.5 mils) at its thickest point, bonded to a 175 micrometer (7 mil) thick inner layer of rigid polyvinyl chloride providing a smooth surface opposite the microlens surface.

An image was formed on the smooth surface of the cover sheet by feeding the cover sheet into a Mitsubishi Model S-3600-30 Thermal Dye Printer using a commercially available Mitsubishi No. SU3-11C3H Thermal Dye Ribbon (yellow, magenta, and cyan) to produce a 3-color image.

A backing of 500 micrometers (20 mils) thick PENTAPRINT™ PR-801/11 from Klockner-Pentaplast of America, comprising amorphous copolyester (KODAR™ PETG Copolyester 6763, $T_g$ of 81° C., from Eastman Chemical Products, Inc.) pigmented to be opaque white with titanium dioxide, was used.

An image was flexographically printed on the first or inner surface of the backing, i.e., the surface to which the cover sheet was to be applied, using a pearlescent ink formulation, to provide a visually-detectable validation feature in the finished card.

The cover sheet and backing were then placed together, with respective imaged surfaces in contact, and passed through a desktop laminator (Thermal Lamination Corporation Model 5500 HR) which heated them to an interfacial temperature of 138° C. (250° F.) with a residence time of about 25 to 30 seconds, to bond the cover sheet and backing together without an intermediate adhesive layer.

After cooling to room temperature, the laminated cover sheet and backing were die cut to yield a finished card of the invention. The resultant identification card exhibited photographic image quality and was durable.

Example 2

This example illustrates the use of an amorphous copolyester cover sheet and a polyvinyl chloride backing in a security card in accordance with the invention.

A cover sheet was made as in Example 1 except a 190 micrometer (7.5) thick clear layer of KODAR™ PETG 6763 Copolyester from Lustro Company was used instead of the rigid polyvinyl chloride layer, it was flexographically imaged, and then a 375 micrometer (15 mil) thick clear layer of the same copolyester from the same company was laminated to the imaged surface (i.e., opposite the microlenses) by passing through the TLC Model 5500 HR Laminator at 121° C. (250° F.) for 25 to 30 seconds.

The backing was a 175 micrometer (7 mil) thick sheet of polyvinyl chloride, pigmented with $TiO_2$, from Transilwrap company, imaged via thermal dye transfer as in Example 1.

The cover sheet and backing were laminated together and the laminate die cut as in Example 1. Both the flexographic and thermal dye images had good image quality and the card was durable.

Comparative Example A

This example illustrates the use of polyvinyl chloride films for both the cover film and backing.

Two sheets of 250 micrometer (10 mil) thick polyvinyl chloride, PENTAPRINT™ PR180/02 from Klockner-Pentaplast of America, were placed inside a desktop laminator like that used in Example 1 for 5 minutes at a temperature of 140° C. (285° F.), and allowed to cool. Good adhesion was obtained, but the long lamination time that is required is longer than desired and considered somewhat impractical for on-site issuing of cards. A trial of the same materials using a dwell time of about 25 to 30 seconds (as with the examples of security cards of the invention) failed to achieve adhesion.

Comparative Example B

This example illustrates the use of polyester films as backings and polyvinyl chloride films as cover films.

An imaged cover sheet like that in Example 1 was used. A 175 micrometer (7 mil) thick polyethylene terephthalate ("PET") film was used as the backing.

The backing and cover sheet were passed through the same laminator under the same conditions as described in Example 1. No adhesion was achieved. The backing and cover sheet were then passed through the laminator at a temperature of 160° C. (360° F.), but again no adhesion was achieved.

Comparative Example C

This example illustrates the use of a polyvinyl chloride cover sheet like that disclosed in Example 1 and another copolyester.

The backing was a 200 micrometer (8 mil) thick film Apet 8A1/21 from Klockner Pentaplast, made from KODAR™ A150, a copolyester having a $T_g$ of 87° C. (189° F.) from Eastman Plastics Company.

When passed through the laminator under the conditions as in Example 1, only very minimal adhesion was achieved. As a result, the cover sheet and backing delaminated easily.

Example 3

This example illustrates the use of another amorphous copolyester in accordance with the invention.

A 50 micrometer (2 mil) thick layer of VITEL PE-222 was extruded onto a PET release liner at 138 to 166° C. (280 to 330° F.) and then laminated to a 375 micrometer (15 mil) thick layer of PETG as used in Example 2 and the release liner removed. The VITEL PE-222 side of this sheet was then contacted to a sheet of polyvinyl chloride like that used in Comparative Example A and passed through the TLC Model 5500 HR Laminator at 121° C. (250° F.) for 25 to 30 seconds. Good adhesion was obtained.

Various modifications and alterations of this invention will become apparent to those skilled in the art without departing from the scope and spirit of this invention.

What is claimed is:

1. A card comprising an amorphous copolyester layer laminated directly to a polyvinyl chloride layer without an intermediate adhesive, at least one of the layers having an at least partially transparent security image that includes a specularly reflective material within the card that is visible through at least one of the layers.

2. The card of claim 1, wherein the polyvinyl chloride layer is rigid, and the amorphous copolyester layer is flexible.

3. The card of claim 1, wherein the polyvinyl chloride layer comprises titanium dioxide to provide whiteness.

4. The card of claim 1, wherein the security image is provided by thermal dye transfer.

5. The card of claim 4, wherein the security image comprises dyes of three colors.

6. The card of claim 1, wherein the amorphous copolyester layer is covered by an abrasion resistant material.

7. The card of claim 1, wherein each major surface of the amorphous copolyester layer is laminated to a polyvinyl chloride layer.

8. The card of claim 1, wherein each major surface of the polyvinyl chloride layer is laminated to an amorphous copolyester layer.

9. The card of claim 1, wherein the polyvinyl chloride layer is also laminated to a vinyl chloride/vinyl acetate copolymer layer.

10. The card of claim 1, wherein the card further comprises a microstructured lens layer.

11. The card of claim 10, wherein the lenses are generally hemispheroidal.

12. The card of claim 10, wherein the lens layer is provided by a curable resin.

13. The card of claim 1, wherein the specularly reflective material includes a liquid crystal polymer.

14. The card of claim 1, wherein the specularly reflective material includes a multilayer high index dielectric coating.

15. The card of claim 1, wherein the specularly reflective material includes a microstructured totally internally reflective material.

16. The card of claim 1, wherein the specularly reflective material includes a pearlescent ink.

17. The card of claim 1, wherein the card further includes a secondary image proved on one of the layers.

18. The card of claim 17, wherein the secondary image includes at least one of a printed image, printed alphanumerics, and a hologram.

19. The card of claim 1, wherein the card further includes a magnetic stripe.

20. The card of claim 1, wherein the card further includes an electronically interactive circuit.

21. The card of claim 1, wherein the card is made by the process of obtaining an electronic image, transmitting the image to a printer, providing the image on the polyvinyl chloride layer, and laminating the polyvinyl chloride and amorphous copolyester layers to each other under heat and pressure.

22. The card of claim 21, wherein the image is provided on the card by diffusing at least one dye into the polyvinyl chloride layer in the presence of heat.

23. The card of claim 21, wherein the process further includes the step of die cutting a card of a desired size following the lamination step.

24. The card of claim 1, wherein one of the layers is between about 500 and 550 micrometers thick, and the other layer is between about 175 and about 250 micrometers thick.

25. The card of claim 1, wherein the card is between about 675 and about 825 micrometers thick.

26. The card of claim 1, wherein the amorphous copolyester is a copolymer of ethylene glycol, cyclohexanedimethanol, and therephthalic acid.

27. The card of claim 26, wherein the amorphous copolyester is a copolymer of terephthalic acid, isophthalic acid, sebacic acid, ethylene glycol, and neopentyl glycol.

28. The card of claim 1, wherein the security image is provided by pigment.

* * * * *